US011727146B2

(12) United States Patent
Veloso et al.

(10) Patent No.: US 11,727,146 B2
(45) Date of Patent: Aug. 15, 2023

(54) SYSTEMS AND METHODS FOR PRIVACY-PRESERVING SUMMARIZATION OF DIGITAL ACTIVITY

(71) Applicant: JPMORGAN CHASE BANK, N.A., New York, NY (US)

(72) Inventors: Maria Manuela Veloso, Pittsburgh, PA (US); Tucker Richard Balch, Suwanee, GA (US); Naftali Y. Cohen, New York, NY (US); Keshav Ramani, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 541 days.

(21) Appl. No.: 16/696,500

(22) Filed: Nov. 26, 2019

(65) Prior Publication Data

US 2021/0157952 A1    May 27, 2021

(51) Int. Cl.
| | |
|---|---|
| *G06F 21/62* | (2013.01) |
| *G06N 20/00* | (2019.01) |
| *G06N 5/04* | (2006.01) |
| *H04N 1/44* | (2006.01) |
| *G06V 20/62* | (2022.01) |

(52) U.S. Cl.
CPC .......... *G06F 21/6254* (2013.01); *G06N 5/04* (2013.01); *G06N 20/00* (2019.01); *G06V 20/62* (2022.01); *H04N 1/448* (2013.01)

(58) Field of Classification Search
CPC ...... G06F 21/6254; G06N 5/04; G06N 20/00; H04N 1/448
See application file for complete search history.

(56) References Cited

U.S. PATENT DOCUMENTS

| | | | |
|---|---|---|---|
| 2007/0104369 A1 | 5/2007 | Weatherhead | |
| 2012/0047203 A1* | 2/2012 | Brown | G06Q 30/02 709/203 |
| 2017/0068829 A1* | 3/2017 | Shaw | G06F 21/50 |
| 2018/0359107 A1* | 12/2018 | Asher | G06V 20/635 |
| 2019/0026212 A1* | 1/2019 | Verkasalo | H04L 67/22 |

OTHER PUBLICATIONS

International Search Report and Written Opinion of the International Searching Authority, dated Mar. 11, 2021, from corresponding International Application No. PCT/US2020/061828.

(Continued)

*Primary Examiner* — Matthew T Henning
(74) *Attorney, Agent, or Firm* — Greenberg Traurig LLP

(57) ABSTRACT

Systems and methods for privacy-preserving summarization of digital activity are disclosed. According to one embodiment in an information processing apparatus comprising at least one computer processor and at least one display, a privacy-preserving digital activity computer program performing the following: (1) capturing a blurred or pixelated screenshot of the at least one display; (2) identifying a plurality of computer application visible in the blurred or pixelated screenshot; (3) identifying a foreground or actively-used application out of the plurality computer applications in the blurred or pixelated screenshot; and (4) logging the visible computer applications and the foreground or actively-used application.

18 Claims, 2 Drawing Sheets

(56) References Cited

OTHER PUBLICATIONS

Jones, Paul; et al., "Towards Automatic Linkage of Knowledge Worker's Claims with Associate Evidence from Screenshots", 2017 IEEE Third international Conference on big Data Computing Service and Applications, Apr. 1, 2017, pp. 17-22.

Dang-Nguyen, Duc-Tien; et al., "Usage Analytics: Research Directions to Discover Insights from Cloud-based Applications", 7th International Conference on Smart Cities and Green ICT Systems, Jan. 1, 2018, pp. 254-261.

\* cited by examiner

SYSTEMS AND METHODS FOR PRIVACY-PRESERVING SUMMARIZATION OF DIGITAL ACTIVITY

BACKGROUND OF THE INVENTION

1. Field of the Invention

Embodiments are directed to systems and methods for privacy-preserving summarization of digital activity.

2. Description of the Related Art

We live in a digital world where computers, smartphones, and other electronic devices are used daily. Our calendars, work documents, and financial reports are all stored in digital forms. In recent years, many techniques were developed to efficiently store and search in the massive amount of digital data we produce.

At the same time, there is a need to identify, understand, and learn our routine behavior. For instance, an employer would like to optimize employees' time and promote collaborative work, while individuals would like to know how much time they spend on digital media and maintain a healthy work-life balance.

SUMMARY OF THE INVENTION

Systems and methods for privacy-preserving summarization of digital activity are disclosed. According to one embodiment in an information processing apparatus comprising at least one computer processor and at least one display, a privacy-preserving digital activity computer program performing the following: (1) capturing a blurred or pixelated screenshot of the at least one display; (2) identifying a plurality of computer application visible in the blurred or pixelated screenshot; (3) identifying a foreground or actively-used application out of the plurality computer applications in the blurred or pixelated screenshot; and (4) logging the visible computer applications and the foreground or actively-used application.

In one embodiment, the captured screenshots may be blurred or pixelated using image-scaling technique. The image-scaling technique may include Nearest-neighbor interpolation, Bilinear and Bicubic algorithms, Sinc and Lanczos resampling, Fourier-transform methods, Convolutional Neural Networks, combinations thereof, etc.

In one embodiment, the plurality of computer applications may be identified using graphical features, spatial patterns, and layout identification landmarks using image-recognition techniques. The image-recognition technique may include Neural Networks, Deep Neural Networks, Convolutional Neural Networks, Capsule Neural Networks, Tree-based algorithms, Support Vector Machines, linear classifiers, non-linear classifiers, combinations thereof, etc.

In one embodiment, the foreground or actively-used application may be identified based on user feedback, may be based on a color layout of the foreground or actively-used application, may be based on a mouse cursor location relative to the other visible computer applications, may be based on a pixelated area relative to the other visible computer applications, may be based on identifying the location and duration of the user's attention using eye-tracking equipment, combinations thereof, etc.

In one embodiment, the identification of attention may be captured using external web-camera, built-in smartphone/desktop/laptop camera, wearable eye-tracking glasses, screen-mounted eye tracking devices, etc. The identification of the user's attention may be computed based on graphical features, spatial patterns, and layout identification of the gaze points, gaze duration, eye-gaze fixation, etc.

In one embodiment, the method may further include logging a time that the visible computer applications and foreground or actively-used application are used.

According to another embodiment, a system for privacy-preserving summarization of digital activity may include a backend executing a logging program and an electronic device comprising at least one computer processor and at least one display and executing a privacy-preserving digital activity computer program. The privacy-preserving digital activity computer program may capture a blurred or pixelated screenshot of the at least one display, may identify a plurality of computer application visible in the blurred or pixelated screenshot, may identify a foreground or actively-used application out of the plurality computer applications in the blurred or pixelated screenshot, may log the visible computer applications and the foreground or actively-used application, and may communicate the log to the logging program on the backend.

In one embodiment, the captured screenshots may be blurred or pixelated using image-scaling technique. The image-scaling technique may include Nearest-neighbor interpolation, Bilinear and Bicubic algorithms, Sinc and Lanczos resampling, Fourier-transform methods, Convolutional Neural Networks, combinations thereof, etc.

In one embodiment, the plurality of computer applications may be identified using graphical features, spatial patterns, and layout identification landmarks using image-recognition techniques. The image-recognition technique may include Neural Networks, Deep Neural Networks, Convolutional Neural Networks, Capsule Neural Networks, Tree-based algorithms, Support Vector Machines, linear classifiers, non-linear classifiers, combinations thereof, etc.

In one embodiment, the foreground or actively-used application may be identified based on user feedback, may be based on a color layout of the foreground or actively-used application, may be based on a mouse cursor location relative to the other visible computer applications, may be based on a pixelated area relative to the other visible computer applications, combinations thereof, etc.

In one embodiment, the foreground or actively-used application may be identified based on user feedback, may be based on a color layout of the foreground or actively-used application, may be based on a mouse cursor location relative to the other visible computer applications, may be based on a pixelated area relative to the other visible computer applications, may be based on identifying the location and duration of the user's attention using eye-tracking equipment, combinations thereof, etc.

In one embodiment, the identification of attention may be captured using external web-camera, built-in smartphone/desktop/laptop camera, wearable eye-tracking glasses, screen-mounted eye tracking devices, etc. The identification of the user's attention may be computed based on graphical features, spatial patterns, and layout identification of the gaze points, gaze duration, eye-gaze fixation, etc.

In one embodiment, the privacy-preserving digital activity may log a time that the visible computer applications and foreground or actively-used application are used.

BRIEF DESCRIPTION OF THE DRAWINGS

To facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Systems and methods for privacy-preserving summarization of digital activity are disclosed. In embodiments, digital media activity on computer desktops and other electronic devices may be captured, and blurred screenshot images of real-time digital activity may be analyzed. Embodiments, may involve self-annotation of the data using a combination of active learning techniques and feedback loop that comes directly from the electronic device or the user. In this way, each user's data and the entire model are isolated and secured, but data summarizing goes beyond the electronic records and leverage capabilities and insights using image recognition.

In embodiments, a dataset that includes real-time digital screenshots captured from a computer setting (single screen or multiscreen) may be collected. The screenshots may include images from multiple overlapping applications that are being executed at the same time. A flexible framework that combines automatic active learning of the samples and classes with feedback from the user and the electronic records may be used to identify the foreground or actively-used application. Because the images are blurred, the learning is done in a privacy preserving manner.

Figure 1:
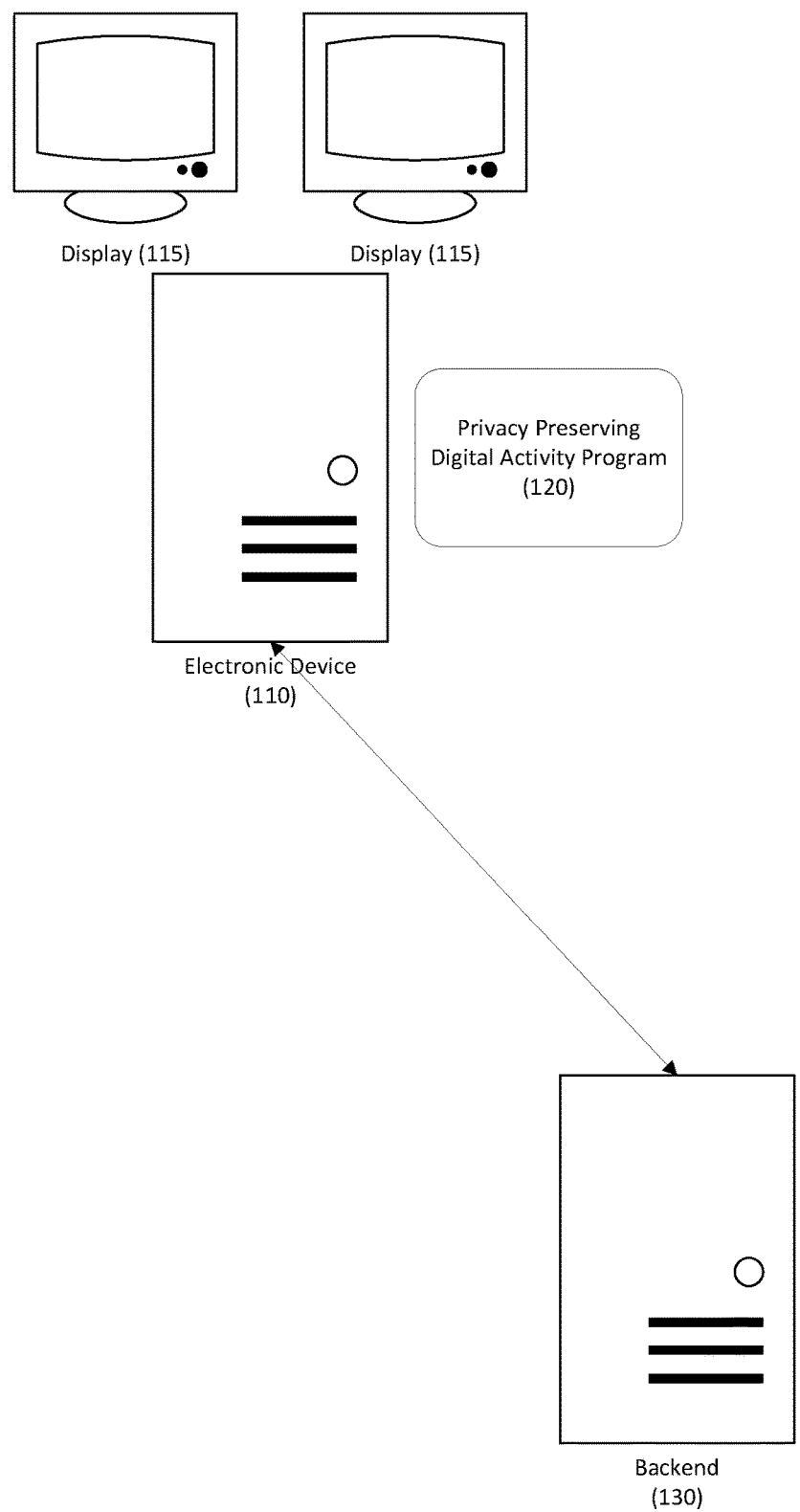
FIG. 1 depicts an architectural diagram of a system for privacy-preserving summarization of digital activity according to one embodiment.

Referring to FIG. 1, a system for privacy-preserving summarization of digital activity is disclosed. System 100 may include electronic device 110, which may be any suitable electronic device with a display, such as a smartphone, notebook computer, desktop computer, workstation, etc. In one embodiment, electronic device 110 may include, or may support, multiple displays 115.

In one embodiment, electronic device 110 may execute privacy-preserving digital activity program 120. Program 120 may periodically take "blurred" screenshots of the information displayed on one or more display 115 supported by electronic device 110. In one embodiment, screenshots may be taken periodically by a computer script that runs in the background. The screenshots may then be blurred using image scaling algorithms, resized to a fraction of its original resolution, and stored locally on device 110. In one embodiment, the screenshots are not saved in their original, high-resolution form.

Examples of image-scaling techniques include Nearest-neighbor interpolation, Bilinear and Bicubic algorithms, Sinc and Lanczos resampling, Fourier-transform methods, Convolutional Neural Networks, etc. Any other suitable image-scaling technique may be used as is necessary and/or desired.

Using one or more image recognition techniques, program 120 may attempt to identify the applications that are visible on display (s) 115 from the captured blurred screenshots. Examples of suitable image-recognition techniques include Neural Networks, Deep Neural Networks, Convolutional Neural Networks, Capsule Neural Networks, Tree-based algorithms, Support Vector Machines, linear classifiers, non-linear classifiers, combinations thereof, etc. Any other suitable image recognition technique may be used as is necessary and/or desired.

Then, program 120 will attempt to identify the foreground or actively-used application. For example, in the blurred or pixelated screenshot, program 120 may recognize the foreground or actively-used application from the color of the application window, the position of the mouse cursor, the positioning of the foreground window relative to other windows (e.g., the window "on top" of another window will be the foreground window), the area occupied by the foreground window relative to the screen size, the location and duration of user's center of attention, combinations thereof, etc.

In one embodiment, program 120 may request identification or confirmation of the foreground or actively-used application in the blurred screenshot from the user. For example, program 120 may request that the user identify the foreground or actively-used application when it cannot identify the foreground or actively-used application from the blurred or pixelated image.

In one embodiment, system 100 may include a plurality of electronic devices 110.

Electronic device 110 may communicate with backend 130. Backend 130 may receive data from program 120. Backend 130 may execute a logging program that receives and stores data from a plurality of electronic devices 110.

In one embodiment, backend 130 may further analyze and summarize the sequential application usage according to the business needs. Example applications for the data include aggregating high-level summary of sequential application usage, highlighting collaborative work, identifying best practices for specific roles, etc.

Program 120 may capture the screenshot(s), ma perform the analysis, and may provide the analysis to backend 130 for organization-wide analysis.

Figure 2:
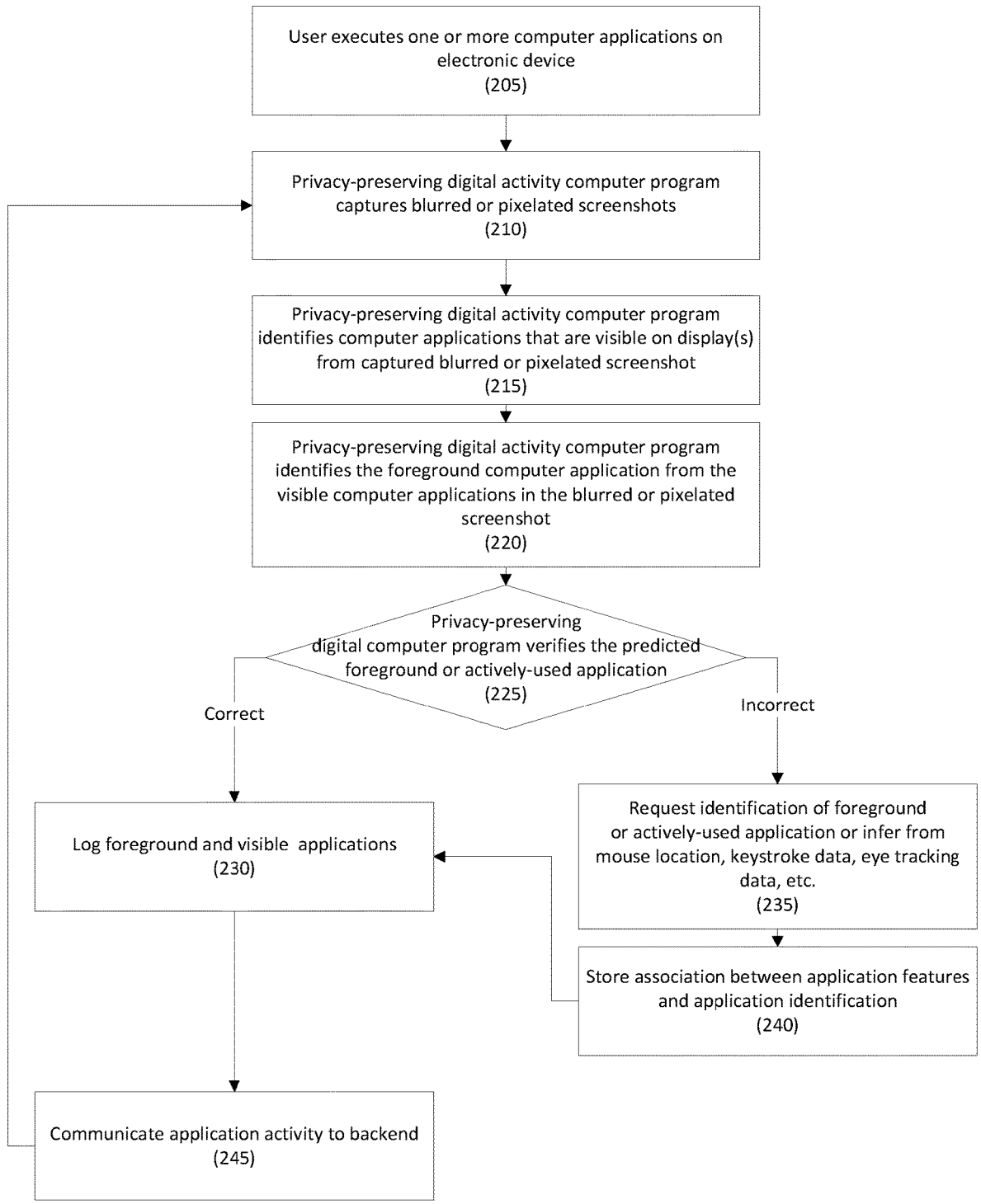
FIG. 2 depicts a method for privacy-preserving summarization of digital activity according to one embodiment.

Referring to FIG. 2, a method for privacy-preserving summarization of digital activity is disclosed.

In step 205, a user may execute one or more computer applications on an electronic device, and the electronic device may display the computer application windows on one or more displays. In one embodiment, one of the plurality of computer applications will be the active, or foreground, application with which the user is interacting.

In step 210, a privacy-preserving digital activity computer program may capture a blurred or pixelated screenshot of the display(s). For example, the screenshot may be captured and then blurred using image scaling algorithms, may be resized to a fraction of its original resolution, and may be stored locally on device 110. In one embodiment, the screenshots are not saved in their original, high-resolution form.

Examples of image-scaling techniques include Nearest-neighbor interpolation, Bilinear and Bicubic algorithms, Sine and Lanczos resampling, Fourier-transform methods, Convolutional Neural Networks, etc. Any other suitable image-scaling technique may be used as is necessary and/or desired.

In step 215, using one or more image-recognition techniques, the privacy-preserving digital activity program may identify the visible computer applications on the display(s) from the captured blurred or pixelated screenshot. Examples of suitable image-recognition techniques may include Neural Networks, Deep Neural Networks, Convolutional Neural Networks, Capsule Neural Networks, Tree-based algorithms, Support Vector Machines, linear classifiers, non-linear classifiers, combinations thereof, etc. Any other suitable image recognition technique may be used as is necessary and/or desired.

In one embodiment, identification may be achieved by extracting the main graphical features, spatial patterns, and/or layout identification landmarks in the blurred or pixelated screenshots, and comparing those using image-recognition techniques with a locally-stored database of labeled pixelated screenshots. Examples of labeled applications may include Microsoft Outlook, Excel, Word, Skype, etc. Any other computer application may be used as is necessary and/or desired.

In one embodiment, if the privacy-preserving digital activity program cannot identify the visible applications, the privacy-preserving digital activity program may request identification from the user.

In step 220, the privacy-preserving digital activity program may attempt to identify the foreground computer application from the identified visible computer applications. For example, the privacy-preserving digital activity program may use colors, display formats, display areas, mouse cursor location, the location and duration of user's center of attention, combinations thereof, etc. to identify the foreground or actively-used application from the pixelated or blurred screenshot.

In step 225, the privacy-preserving digital activity program may attempt to verify the predicted foreground or actively-used application with the user's feedback. In one embodiment, the verification may not be performed if the privacy-preserving digital activity program has above a certain confidence level in the foreground or actively-used application.

In step 230, the privacy-preserving digital activity program may log the visible computer applications and the foreground or actively-used application. In one embodiment, it may log the time that the foreground or actively-used application was used as well as the other visible computer applications.

If, in step 225, the privacy-preserving digital activity program cannot identify the foreground or actively-used application, in step 235, the privacy-preserving digital activity program may request that the user identify the foreground or actively-used application, or it may infer the identity of the foreground or actively-used application from the mouse cursor location, the user's center of attention, keystroke data, etc.

In step 240, the privacy-preserving digital activity program may store and associate the graphical and spatial pattern of the foreground or actively-used application with the correct application label, and, in step 230, may log the correct label in the locally-stored database.

In step 245, the privacy-preserving digital activity program may communicate the foreground or actively-used application, and all visible applications, including the time and dates of usage to a backend.

The process may be repeated periodically and/or as necessary and/or desired.

Although several embodiments have been disclosed, it should be recognized that these embodiments are not mutually exclusive, and features from one embodiment may be used with others.

Hereinafter, general aspects of the implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above, may be performed by two distinct components. Similarly, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used by the various embodiments of the invention. Illustratively, the programming language used may include assembly language, Ada, APL, Basic, C, C++, C#, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine; utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, eye-tracking equipment, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interacts with a user interface used by the processing machine of the invention. Rather, it is also contemplated that the user interface of the invention might interact, i.e., convey and receive information, with another processing machine, rather than a human user.

Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

What is claimed is:

1. A method for privacy-preserving summarization of digital activity, comprising:
   in an information processing apparatus comprising at least one computer processor and at least one display, a privacy-preserving digital activity computer program performing the following:
   capturing a screenshot of the at least one display;
   blurring the screenshot using an image-scaling algorithm;
   labeling a plurality of computer applications visible in the blurred screenshot using a neural network;
   identifying a foreground or actively-used application out of the plurality of computer applications in the blurred screenshot based on at least one of a color layout of each of the plurality of computer applications and a positioning of each of a plurality of windows for the plurality of computer applications relative to each other; and
   logging the visible computer applications and the foreground or actively-used application in a log file.

2. The method of claim 1, wherein the plurality of computer applications are further identified using graphical features, spatial patterns, and layout identification landmarks.

3. The method of claim 1, wherein the foreground or actively-used application is identified based on user feedback.

4. The method of claim 1, wherein the foreground or actively-used application is further identified based on the color layout of the foreground or actively-used application.

5. The method of claim 1, wherein the foreground or actively-used application is further identified based on a mouse cursor location or a pixelated area relative to another visible computer application.

6. The method of claim 1, wherein the foreground or actively-used application is further identified by identifying a center of attention and gaze duration for a user.

7. The method of claim 1, further comprising:
   logging a time that the visible computer applications and foreground or actively-used application are used.

8. The method of claim 1, wherein the image-scaling algorithm resizes the screenshot to a fraction of its original resolution.

9. The method of claim 8, wherein the image-scaling algorithm is selected from the group consisting of Nearest-neighbor interpolation, Bilinear and Bicubic algorithms, Sinc and Lanczos resampling, Fourier-transform methods, Convolutional Neural Networks, and combinations thereof.

10. A system for privacy-preserving summarization of digital activity, comprising:
    a backend executing a logging program; and
    an electronic device comprising at least one computer processor and at least one display and executing a privacy-preserving digital activity computer program;
    wherein:
    the privacy-preserving digital activity computer program captures a screenshot of the at least one display;
    the privacy-preserving digital activity computer program blurs the screenshot using an image scaling algorithm;
    the privacy-preserving digital activity computer program labels a plurality of computer applications visible in the blurred screenshot using a neural network;
    the privacy-preserving digital activity computer program identifies a foreground or actively-used application out of the plurality of computer applications in the blurred screenshot based on at least one of a color layout of each of the plurality of computer applications and a positioning of each of a plurality of windows for the plurality of computer applications relative to each other;
    the privacy-preserving digital activity computer program logs the visible computer applications and the foreground or actively-used application in a log; and
    the privacy-preserving digital activity computer program communicates the log to the logging program on the backend.

11. The system of claim 10, wherein the plurality of computer applications are further identified using graphical features, spatial patterns, and layout identification landmarks using image-recognition techniques.

12. The system of claim 10, wherein the foreground or actively-used application is identified based on user feedback.

13. The system of claim 10, wherein the foreground or actively-used application is further identified based on the color layout of the foreground or actively-used application.

14. The system of claim 10, wherein the foreground or actively-used application is further identified based on a mouse cursor location or a pixelated area relative to another visible computer application.

15. The system of claim 10, further comprising:
    eye tracking equipment;
    wherein the eye tracking equipment identifies a center of attention and gaze duration for a user, and wherein the foreground or actively-used application is further identified based on the center of attention and gaze duration.

16. The system of claim 10, wherein the privacy-preserving digital activity computer program logs a time that the visible computer applications and foreground or actively-used application are used.

17. The system of claim 10, wherein the image-scaling algorithm resizes the screenshot to a fraction of its original resolution.

18. The system of claim 17, wherein the image-scaling algorithm is selected from the group consisting of Nearest-neighbor interpolation, Bilinear and Bicubic algorithms, Sinc and Lanczos resampling, Fourier-transform methods, Convolutional Neural Networks, and combinations thereof.

* * * * *